United States Patent [19]

Remijan

[11] 4,395,124
[45] Jul. 26, 1983

[54] APPARATUS FOR POSITION ENCODING
[75] Inventor: Paul W. Remijan, Southbridge, Mass.
[73] Assignee: Randwal Instrument Co., Inc., Southbridge, Mass.
[21] Appl. No.: 239,524
[22] Filed: Mar. 2, 1981

Related U.S. Application Data

[62] Division of Ser. No. 863,948, Dec. 23, 1977, Pat. No. 4,265,534.

[51] Int. Cl.³ ............................................... G01B 9/00
[52] U.S. Cl. ................................. 356/373; 350/162.2; 356/356; 250/237 G
[58] Field of Search ............... 356/353, 354, 356, 373, 356/374, 375; 350/3.7, 162 R, 162.2; 250/237 G

[56] References Cited
U.S. PATENT DOCUMENTS 3,738,753 6/1973 Huntley ........................ 250/237 G
3,996,468 12/1976 Jablonowski ................... 250/237 G
4,025,197 5/1977 Thompson ........................ 356/401
4,091,281 5/1978 Willhelm et al. ............... 250/237 G
4,176,276 11/1979 Kaul et al. ...................... 356/356

Primary Examiner—R. A. Rosenberger
Attorney, Agent, or Firm—Cesari and McKenna

[57] ABSTRACT

A position encoder including a holographically recorded, single-frequency, phase grating. When this phase grating is illuminated by a quasi-monochromatic spatially coherent light source, it acts as a basic common path interferometer and constitutes a highly efficient source of high contrast, stable, interference fringe patterns. In a position encoder application, a carrier moves the grating in a plane that is orthogonal to an axis from the light source. Motion of the carrier is detected as the fringe pattern moves past detecting means thereby to sense motion and provide position information in the form of electrical signals.

20 Claims, 11 Drawing Figures

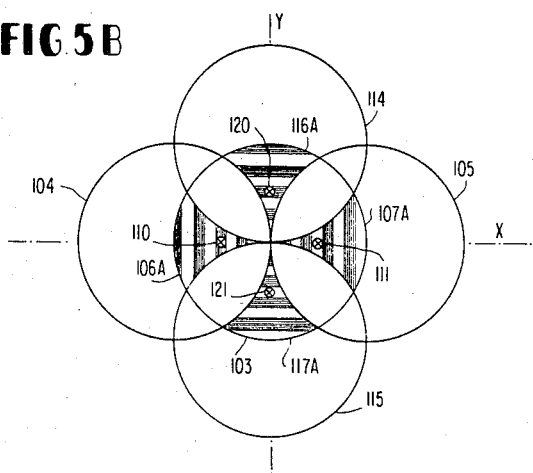
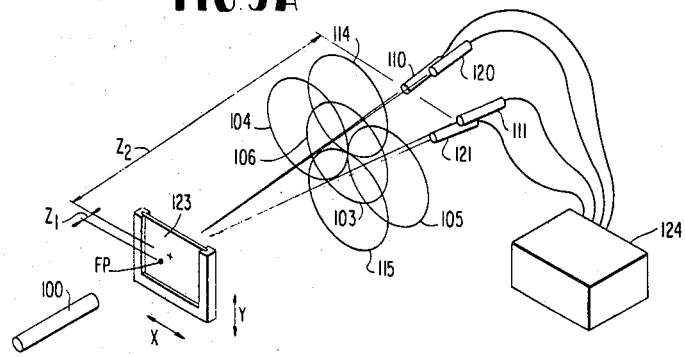

APPARATUS FOR POSITION ENCODING

CROSS REFERENCE TO RELATED APPLICATION

This is a divisional application of my application Ser. No. 863,948, filed Dec. 23, 1977, for Optical Apparatus and Method for Producing the Same, now U.S. Pat. No. 4,265,534.

BACKGROUND OF THE INVENTION

This invention generally relates to the field of optical measuring and testing and more specifically to apparatus for using interference fringe patterns for position encoding. There are two basic methods for producing fringe patterns: (1) an interferometric technique that utilizes interference phenomena, and (2) a Moire technique that utilizes shadow casting and/or pattern multiplication.

There are a wide variety of measuring and testing procedures that utilize interference fringe patterns and there are many ways to produce and control interference fringes. Generally, an interference fringe pattern is produced when at least two coherent beams of light are brought together and interact. When two coherent beams interact, they destructively interfere to produce dark spots or bands and constructively interfere to produce bright spots or bands.

Moire fringes are produced when two similar, geometrically regular patterns consisting of well defined clear and opaque areas are juxtaposed and transilluminated. Some examples of geometrically regular patterns used to generate Moire fringes include (1) Ronchi rulings, (2) sets of concentric circles, and (3) radial grids. The generation of Moire fringes can be considered as shadow casting; that is, the shadow of the first pattern falling onto the second pattern produces the Moire fringes. The mathematical function describing Moire fringes is obtained by multiplying the intensity transmissions or irradiances of the overlapped geometrically regular patterns.

Apparatus using Moire or interferometric techniques is used to position accurately two elements relative to each other. With interferometric techniques, an incoming beam of light is generally split into two parts. One part is reflected from a reference position; the other, from a movable element. The reflected beams are recombined to produce an output fringe pattern that "moves" as the movable element moves. In one example of a Moire technique, two high contrast Ronchi rulings of slightly different spatial frequencies are juxtaposed and transilluminated. One ruling is stationary while the other is movable in a predetermined plane. Photodetectors sense the variations in the light that passes through the gratings and produce signals that indicate the motion.

Certain disadvantages exist in apparatus that utilizes the interferometric techniques to form fringe patterns in position detection applications. For example, in such apparatus the two light beams generally travel through different light paths that contain distinct optical elements. If the elements in each path are not matched optically, aberrations distort the fringe pattern. Matched optical elements can eliminate the aberration problem; however, they significantly increase the overall expense of the apparatus. Moreover, this apparatus is subject to various outside influences, such as vibration and thermal change. These influences can cause fringe pattern motion or noise and lead to improper measurements.

Moire techniques also have many limitations. When small spacings and high accuracies are required, the geometrically regular patterns used to generate Moire fringes are quite difficult and expensive to produce. In applications where one ruling moves next to a fixed ruling, the spacing between the rulings must be held constant or errors result. Also, Moire fringes are localized, i.e., they exist in a very small region of space, and additional optical components are often required to image the Moire fringes into desired regions.

Recently, an amplitude grating and a spatially coherent, quasi-monochromatic light source have been used to generate interference fringes. An amplitude grating is a generally transparent to semi-transparent media whose opacity is altered in accordance with some spatially periodic pattern. An amplitude grating "breaks up" or diffracts an incoming beam of light into a series of diffracted cones or orders. The strength, or amount, of light in each order depends upon the exact shape of the periodic opacity of the amplitude grating. Although various diffracted orders could be approximately the same strength, scalar diffraction theory for a thin amplitude grating predicts that the dominant strength will lie in the zero order undiffracted light and that the strength of other diffracted orders will vary. Indeed, practical applications bear out this prediction.

In the apparatus in U.S. Pat. No. 3,738,753, issued June 12, 1973, light passes from a source through an amplitude grating to produce different order cones of diffracted light: for example, zero order and first order cones. To compensate for the different intensities, the diffracted light cones are reflected back through the grating. After the second passage through the grating, the zero order cone of the reflected first order cone and the first order cone of the reflected zero order cone have equal strengths and are combined to form a high contrast interference fringe field. This double pass system is quite stable because it closely approximates a common path interferometer. In a common path interferometer the interfering beams traverse the same optical path. Therefore, perturbations affect both beams simultaneously and do not distort the output fringe pattern which is sensitive only to differences between the two optical paths. However, problems in such a double pass system do occur because it is difficult to control grating substrate aberrations and mirror-grating separation.

Further improvements have been made with the advent of holographically produced amplitude gratings. Holographic amplitude gratings are produced by exposing a high resolution photographic emulsion to the precise interference pattern of a laser two-beam interferometer. During ordinary photographic processing, the photosensitive silver halide in the emulsion converts into opaque metallic silver to form the amplitude grating.

In U.S. Pat. No. 3,829,219, issued 1974 to Wyant, and U.S. Pat. No. 4,118,124 issued Oct. 3, 1978 to Matsuda, one such holographic grating, a double frequency holographic grating, produces a so-called "shearing" pattern. This grating is produced by sequentially exposing a single photographic emulsion to a first laser interference pattern of a first spatial frequency, $f_1$, and then to a second laser interference pattern of a second spatial frequency, $f_2$. Equal amplitude transmission modulations at both frequencies $f_1$ and $f_2$ are achieved by adjusting the exposure to the first and second laser patterns. Ordinarily, the two sequential exposures are identical, but if $f_1$ and $f_2$ are very different or if one laser pattern is in red light and the other is in green light, the sequential exposures must be compensated for the spectral and frequency responses of the photographic plate. These exposure adjustments to achieve equal amplitude transmission modulations in $f_1$ and $f_2$ are usually done by trial and error.

Upon illumination with spatially coherent, quasimonochromatic light, this double frequency grating produces two first order light cones of equal strength, one light cone being associated with each of the $f_1$ and $f_2$ frequencies. These two first order light cones interact to form a very stable, high contrast fringe pattern. Such a double frequency holographic shearing interferometer also is a common path interferometer. It is simple to construct. However, in this interferometer it is necessary to separate the zero order cone from the interacting first order cones. This separation requirement limits the f/number of the input light cone and the amount of shear obtainable. Moreover, if the two first order cones have high diffraction angles an astigmatic distortion of the output fringe field exists. In addition, the efficiency, or ratio of output fringe field power to input power, is only about 2%.

For many years people have bleached photographically recorded amplitude gratings to obtain ¢phase gratings". One basic type of such bleaching, known as volume bleaching, chemically converts the opaque silver in the photographic emulsion into a transparent, high index silver salt. A second type of bleaching, known as tanning, chemically removes the developed silver within the emulsion and leaves a void. A tanned phase grating has a corrugated surface. Whereas an amplitude grating selectively absorbs light, a bleached phase grating selectively introduces phase delays across the input light beam. As a result, a phase grating is much more efficient than an amplitude grating; that is, the ratio of first order power to input power is greater.

However, bleached gratings are generally characterized by substantial problems. They are very noisy and also may deteriorate physically back into amplitude gratings upon extended exposure to light. Bleached gratings also have a lower spatial frequency response than amplitude gratings. Although volume bleached gratings are less noisy and have a higher spatial frequency response than their tanned counterparts, they generally are weaker and less efficient.

The efficiency of a volume bleached grating can be increased by increasing its thickness. However, any substantial increase in thickness drastically changes the basic diffraction properties of the grating. Any amplitude or phase grating can be considered optically thick when the optical thickness of the emulsion is more than five times the grating spacing. A grating can be considered optically thin if the optical thickness of the emulsion is less than half the grating spacing. Properties of thick gratings are accurately predicted by electromagnetic theory, while properties of thin gratings are described by scalar diffraction theory. For example, a thick phase grating output consists of only the zero order and one first order diffracted cone. In addition, diffraction takes place only for a plane wave input at a certain specified angle with respect to the grating. On the other hand, a thin grating of the same spacing produces multiple orders (i.e. the 0, $\pm 1$, $\pm 2$, $\pm 3$, etc. orders) with either a spherical wave or plane wave input at an arbitrary angle with respect to the grating.

Distinctions between optically thin amplitude and optically thin phase gratings are accurately predicted by scalar diffraction theory. When a pure sinusoidal amplitude transmission perturbation exists in a thin amplitude grating, only the zero and $\pm 1$ diffracted orders exist. When a pure sinusoidal phase perturbation occurs in a thin phase grating, many orders (e.g., the 0, $\pm 1$, $\pm 2$, $\pm 3$, and other orders) are observed. The strengths of the phase grating orders are proportional to the normalized Bessel functions $[J_n(m/2)]^2$, where n is the order number (e.g., n equals 0, $\pm 1$, $\pm 2$, ...) and m is the strength of size of the phase perturbation in radians. When the amplitude grating perturbation departs from a pure sinusoidal form, additional diffracted orders are generated. The strengths of these additional orders are directly related to the strengths of the Fourier components associated with the grating perturbation function.

With a phase grating, the diffracted orders associated with a non-sinusoidal phase perturbation are predicted by convolving the individual outputs from each Fourier component of the phase perturbation. Such a multiple convolution reveals complicated phase relationships between multiple orders associated with just one particular Fourier component. In addition, diffracted orders corresponding to sum and difference frequencies are generated when the phase perturbation consists of more than one fundamental spatial frequency. For example, one might consider bleaching the previously discussed double-frequency holographic grating to improve its poor efficiency. Although bleaching will increase the overall efficiency of such a grating, the bleached grating, in accordance with the convolutional operation, produces sum and difference frequency diffraction cones that are in addition to and that interact with the desired fundamental frequency diffraction cones. It is then possible for the sum and difference frequency diffraction cones to destroy the fringe field.

Therefore, it is the object of this invention to provide an improved holographic phase grating for producing a high contrast interference pattern.

Another object of this invention is to provide an improved holographic grating that is useful in a number of applications including position detection.

Yet another object of this invention is to provide apparatus for accurate detection of position information.

SUMMARY

In accordance with a specific embodiment of this invention, a quasi-monochromatic, spatially coherent light source is positioned adjacent to one side of a holographic grating and directs light to the grating along a light axis. This produces a first diffraction and a second diffraction of different order that have equal strength and that overlap thereby to produce a high contrast, low-noise interference pattern in the area of overlap of the two diffractions. Photodetectors are disposed on the opposite side of the grating to receive the interference pattern. Relative motion between the photodetection means and the grating in a plane that is normal to the light axis is readily detected and accurately measured by the photodetectors.

This invention is pointed out with particularity in the appended claims. The above and further objects and advantages of this invention may be better understood by referring to the following description taken in conjunction with the accompanying drawings.

BRIEF DESCRIPTION OF THE DRAWINGS

FIG. 5A is a diagram of an alternate embodiment of a position encoder constructed in accordance with this invention for sensing motion along orthogonal axes; FIG. 5B depicts typical fringe patterns that are produced by the apparatus shown in FIG. 5A;

DESCRIPTION OF ILLUSTRATIVE EMBODIMENTS

A. Holographic Grating

Figure 1:
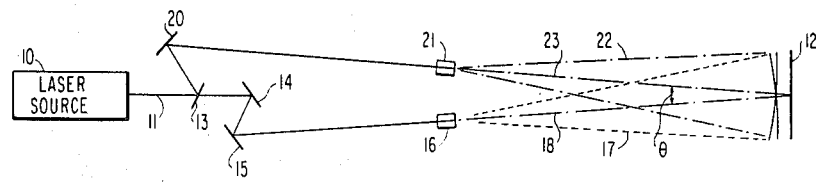
FIG. 1 is a diagram that illustrates the apparatus for producing a holographic grating in accordance with this invention.
Figure 2:
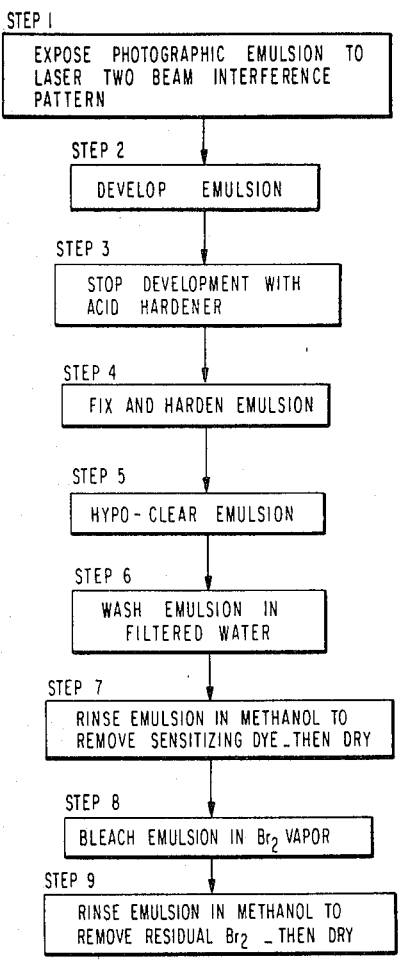
FIG. 2 is a chart that depicts the various basic steps for processing a holographic grating in accordance with this invention.

FIG. 1 depicts, in diagrammatic form, the arrangement of apparatus necessary for exposing a photographic plate during the production of a holographic phase grating. The holographic phase grating produced in accordance with the arrangement shown in FIG. 1 and the procedures outlined in FIG. 2 are essential to the operation of the diverse embodiments of the invention that are shown in the other Figures. Specifically, this apparatus includes a laser source 10 which directs light along an axis 11. The other apparatus in FIG. 1 splits the light into parts that travel over two separate paths and are then brought back together to expose a photographic plate 12.

A conventional beamsplitter 13 separates the light into two parts. A first part travels along a first path that includes mirrors 14 and 15 for reflecting the light into an objective lens and pinhole 16, thereby to produce a spherical wave that emanates from a point source at the pinhole. The wave appears in a cone 17 and is directed toward the photographic plate along an axis 18. The second path established by the beamsplitter 13 includes a mirror 20 and an objective lens and pinhole 21 that produce a spherical wave cone 22 that emanates from a point source at that pinhole along an axis 23. The light waves from these two point sources combine; they destructively interfere to produce dark bands and constructively interfere to produce bright bands at the photographic plate 12.

The photographic plate 12 mounts on a rotary table which positions the photographic plate 12 and accurately establishes an angle $\theta$ between the axes 18 and 23. The spatial frequency, $\xi$, of the interference pattern at plate 12 is closely aproximated by the equation $$\xi = [2 \sin(\theta/2)]/\lambda, \quad (1)$$

where $\lambda$ is the laser wavelength. Although the fringes produced at the plate 12 are slightly hyperbolic, they are excellent approximations to rectilinear bands and therefore are shown as such in various Figures. Increasingly better approximations to rectilinear bands are achieved by increasing the distance along the axes 18 and 23 between the plate 12 and the pinholes 16 and 21 respectively.

The apparatus diagrammed in FIG. 1 has been used to manufacture gratings having the desirable properties that characterize my invention. The equipment is simple and relatively inexpensive. For example, the laser 10 can comprise a $TEM_{00}$ mode laser; the beamsplitter 13, a conventional variable density beamsplitter that enables the intensity of the two beams to be equalized. The mirrors 14, 15 and 20 are standard planar mirrors. The objective lens comprises a conventional 10X microscope objective, and the pinhole matches that objective lens. The distances 18 and 23 are approximately 2 meters. With this specific arrangement, I am able to obtain a 500 line-per-millimeter interference fringe pattern over a 3"×3" area with maximum fringe displacement error of about 0.00254 millimeters.

Once the apparatus in FIG. 1 is arranged, the emulsion on the photographic film can be exposed to the interference pattern as shown as Step 1 in FIG. 2. During this exposure step, certain controls must be exercised to assure a holographic grating of good quality. For example, the exposure should be made in an environment that is not subjected to vibrations. Thermal disturbances should be minimized as any air flow between the beamsplitter 13 and the photographic plate 12 can distort the resulting fringes. In applications where very high densities and minimal distortions are required the distances along axes 18 and 23 must be increased to 5 or even 10 meters. Precise determinations of $\lambda$ and $\theta$ must be made. Although this basic apparatus can be used to produce highly accurate holographic phase gratings, the maximum accuracy ultimately then will be determined by the accuracy of angular measuring equipment, the stability of the single frequency laser, the optical table stability, and the atmospheric and thermal controls that are exercised.

In order to produce a phase grating with special properties that enable the construction of the various disclosed embodiments, it is first necessary to produce an amplitude grating. Given the various properties of commercially available photographic emulsions and developers, a thin emulsion photographic plate and a chemically compatible developer are selected. A process of heavily overexposing and underdeveloping the emulsion reduces the optical thickness of the processed emulsion to a fraction of its original physical thickness. Thus, by utilizing the controls set forth in steps 1 and 2 of FIG. 2, one produces an amplitude grating characterized by having:

1. an optically thin emulsion conforming to scalar diffraction theory;
2. a specific form for the absorbtion function which converts to a correspondingly specific phase transmission function after bleaching; and
3. a specific amplitude or strength of the absorbtion function which converts to a specific peak to peak phase modulation after bleaching.

Specific plate types, exposures, development times and developers are discussed later.

Once the development of step 2 is complete, the photographic plate is washed in an acid short-stop solution in step 3. The solution contains an acid hardener. A two-minute treatment in a hardening bath produces acceptable results.

In step 4 the emulsion of the photographic plate is fixed and hardened. A standard fixing bath and acid hardener have been used successfully, the plate being immersed in the bath for about ten minutes.

Next (step 5) the emulsion is prewashed for thirty seconds and hypo-cleared in a hypo clearing bath for about two minutes. In step 6 the emulsion is washed (e.g., twenty minutes in filtered water) and then soaked in a methanol bath until all residual sensitizing dye is removed (step 7). Once the methanol bath has been completed, the plate is dried in a light blow air drying operation.

All the foregoing steps are conventional photographic processing steps that utilize commericially available chemicals. Upon completion of step 7 an amplitude grating has been produced. Steps 8 and 9 then convert this amplitude grating into a phase grating having the desired characteristics.

More specifically, after the photographic plate is dried thoroughly in step 7, it is bleached during step 8 in a bromine vapor until the plate is clear. Once the bleaching operation has been completed, the plate is rinsed in a methanol bath to remove residual $Br_2$ and dried thoroughly by a light blow air drying operation in step 9.

It now will be beneficial to discuss certain characteristics of these holographic phase gratings that are particularly desirable. First, the exposure and development times and the emulsion have been chosen to produce "thin" gratings. As a specific example, I have made 393.7 line-per-millimeter gratings on Kodak 131-01 plates according to the foregoing processing procedure using an average exposure of 200 ergs/cm$^2$ and a development time of 15 seconds in standard Kodak D-19 developer at 80° F. Uniform development is achieved by using a large development tank and rapid manual agitation of the plate. After complete processing in accordance with the steps of FIG. 2, the resulting thin phase grating diffracts both input spherical waves as well as input plane waves; as previously stated, a thick grating diffracts only input plane waves incident at a particular angle with respect to the grating.

Measurements have shown that a thin phase grating manufactured according to the foregoing process has a pure sinusoidal phase transmission function whose peak-to-peak phase delay produces equal strength zero and ±1 diffraction orders. The 200 ergs/cm$^2$ exposure produces an average amplitude transmission of approximately 0.45 for the developed, but unbleached, Kodak 131-01 plates. Experimental data has confirmed that a pure sinusoidal phase transmission function is maintained when the thin grating has an average amplitude transmssion of 0.5 or less in its developed but unbleached state. The strength or peak-to-peak phase delay of the final phase grating is adjusted by controlling the initial exposure (Step 1, FIG. 2) within the limits set by an average amplitude transmission of 0.5 (measured after Step 7 in FIG. 2). A very weak phase grating produced with low exposure levels exhibits a strong zero order diffraction, a weak first ordeer, and an even weaker second order. Stronger gratings produced with higher exposure levels exhibit increasingly more powerful first and second order diffraction and decreased zero order diffraction. Equal strength zero and ±1 diffraction orders or equal strength zero and ±2 diffraction orders are achieved by a trial and error adjustment of the initial exposure.

The advantages of such a thin phase grating that produces two different diffraction orders of equal strength will now become apparent in the following discussion of an interferometer that utilizes such a phase grating.

B. Interferometer

Figure 3:
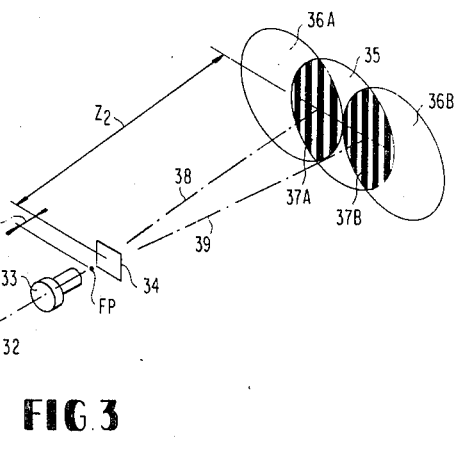
FIG. 3 is a diagram of an interferometer constructed in accordance with one aspect of this invention for producing fringe patterns.

Referring now to FIG. 3, an interferometer is depicted in schematic form that includes a helium neon laser 30 which directs light along an axis 31 to a negative lens 32. The negative lens 32 expands the beam slightly so that it completely fills a microscope objective 33. The microscope objective 33 focuses this light at a focal point FP displaced a distance $Z_1$ from a holographic grating 34 constructed as described above. The laser 30, negtive lens 32 and microscope objective 33 constitute a source of a quasi-monochromatic diverging spherical wave that emanates from the focal point FP. In one embodiment, the cone from the focal point FP is an f/2 cone.

When the spherical wave from the point source at the focal point FP strikes the grating 34, it produces a number of cones of diffraction. According to scalar diffraction theory, the strength of the diffracted cones is governed by the Bessel function $[J_n(m/2)]^2$ where n is the diffraction order number and m is the grating transmission function peak-to-peak phase delay in radians. The previously specified exposure and development times yield a value of m=2.870 at=6328 Å. The zero and first order diffraction cones are of equal intensity because $[J_0(1.435)]^2 = [J_1(1.435)]^2$. Moreover, the diffraction angles are such that the zero order cone overlaps both first order cones while the first order cones merely abut each other. At some point at a distance $Z_2$ from the grating 34, an output such as is shown in FIG. 3 is produced. The zero order cone appears planar circle 35, first order cones appear as planar circles 36A and 36B. Areas 37A and 37B are areas of overlap and the fringes are produced in those areas. Moreover, the fringes in the areas 37A and 37B are out of phase with each other. Thus, if the centrally located fringe in area 37A is a dark band, the corresponding fringe in area 37B is a light, or bright, band. By "light" and "dark" bands, I do not means bands having the same intensity across the band, as the bands are shown in the drawings. The fringe intensity actually varies smoothly and is proportional to the square of a sine function, although the eye may perceive distinct alternating bands under some illumination conditions.

The 180° phase shift between the fringes in areas 37A and 37B is a direct result of having a pure sinusoidal phase transmission function associated with grating 34. When the phase transmission function of 34 departs from a pure sinusoid, the fringes in the areas 37A and 37B will have some other phase relationship not equal to 180°. The 180° phase shift is not essential to the production of high contrast fringe patterns; but it is important in a position detecting application where quadrature electrical signals are derived from the central fringes. Control of the grating transmission function form is achieved by selecting the proper combination of emulsion, developer, exposure and development time as previously discussed.

The interferometer shown in FIG. 3 has several properties. If the distance $Z_1$ is varied, the number of fringes within the overlap areas 37A and 37B changes. Specifically, decreasing the distance $Z_1$ decreases the number of fringes that appear in the overlap areas. As $Z_1$ is varied, fringes "flow" into or out of the areas 37A and 37B. Although this "fringe flow" may cause the central fringes to widen or narrow, it does not move the central fringes; they remain located at the centers of their respective areas. The importance of this central fringe behavior with $Z_1$ variations will be discussed later. If the grating 34 is moved in a plane that is normal to the axis 3 and perpendicular to the direction of the fringes, all the fringes in the areas 37A and 37B appear to slide through those areas, but the number of fringes in those areas remains unchanged. If the distance $Z_2$ varies, the number of fringes also remain the same, but in this case their sizes change, the fringe widths becoming smaller as $Z_2$ decreases. The interferometer parameters are related by the equation:

$$T = (Z_2 + Z_1)/\xi Z_1 \tag{2}$$

Where T is the fringe period in overlap regions 37A and 37B, $\xi$ is the spatial frequency of the grating 34 defined by equation (1) and $Z_1$ and $Z_2$ are the positive distances shown in FIG. 3.

The holographic grating interferometer in FIG. 3 is very stable and free of fringe distortion from outside influences because it is essentially a common path interferometer. Atmospheric changes, air currents and thermal instabilities do not distort the fringes. Moreover, the intensity of the light in each of the diffraction cones is much greater than that usually obtained from amplitude gratings because the phase grating essentially is transparent and relies entirely on time delays within the grating 34 to produce the diffraction cones. As a result, the overall brightness of the fringe pattern is increased. Moreover, as the intensities in each of the zero-order and first-order cones are equal, the destructive and constructive interferences tend to be complete so the dark bands are essentially black while the bright bands are essentially twice as bright as the average light. Thus the grating enables the production of a simple common path interferometer that produces bright, high-contrast fringes.

The foregoing properties lay a basis for understanding applications of a bleached phase grating in position encoders. In such encoders the $Z_1$ and $Z_2$ distances remain essentially unchanged, but the grating is allowed to move thereby to shift the fringes.

C. Position Encoder

In accordance with this invention, the interferometer shown in FIG. 3 is readily adapted to use in a position control system. As previously indicated, the fringes in the areas of overlap 37A and 37B in FIG. 3 move through the area of overlap in the direction of motion of the grating. Moreover, if the distance $Z_1$ between the focal point FP and the grating remains constant, the number of fringes in the area of overlap remain constant. On the other hand, if the distance $Z_2$ varies, then the number of fringes within the area of overlap remains the same but the area of the overlap varies, as would be expected in a projection type system.

Figure 4A:
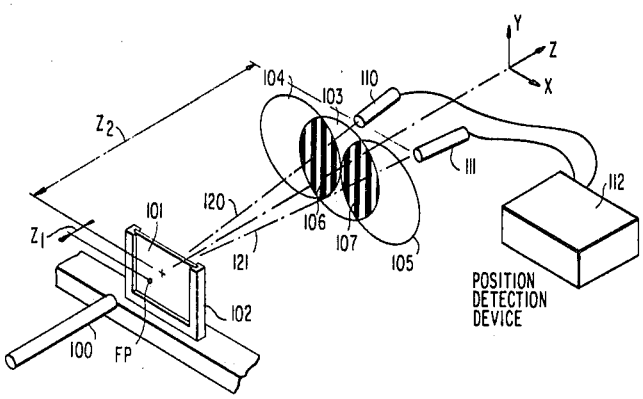
FIG. 4A is a diagram of an embodiment of a position encoder constructed in accordance with this invention.

A specific embodiment of a position encoder that can be used in a wide variety of measurement and control functions is disclosed in FIG. 4A. In FIG. 4A, light emanates from a point source 100 of quasi-monochromatic, spatially coherent light. A holographically recorded, single-frequency phase grating 101 is mounted in a carrier 102 that moves in in the X direction of an XY plane that is orthogonal to the light, or Z, axis. Light from the source 100 is diffracted into equal strength zero and first order cones by the grating 101 that is supported in a carrier 102. The zero order distribution is represented as a planar circle 103 while the two first order distributions are depicted by planar circles 104 and 105. The fringes in the areas of overlap 106 and 107 are projected onto photodetectors 110 and 111 that generate input signals for a position detection circuit 112, such circuits being well known in the art.

Figure 4B:
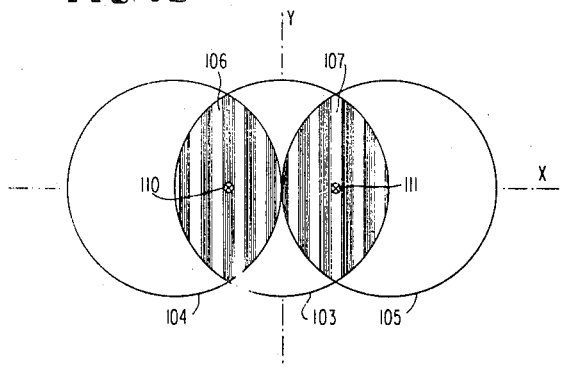
FIGS. 4B and 4C depict typical fringe patterns that are produced by the apparatus shown in FIG. 4A.

Referring to FIG. 4B, the photodetectors 110 and 111 are horizontally oriented in the central fringe that is produced in each of the areas of overlap 106 and 107; i.e., on axes 120 and 121 respectively. As previously explained, controlling the form of the grating phase transmission function causes the fringes in one area of overlap to be 180° out of phase with the fringes in the other area of overlap. As shown in FIG. 4B the photodetector 110 is aligned with a dark band at the central fringe position while the photodetector 111 is aligned with a bright band at the central fringe position. For purposes of the photodetection, this particular embodiment is particularly simplified if the light source 100 generates red or near infrared light as photodetection cells, such as photodiodes, are particularly sensitive in this region of the spectrum.

Figure 4C:
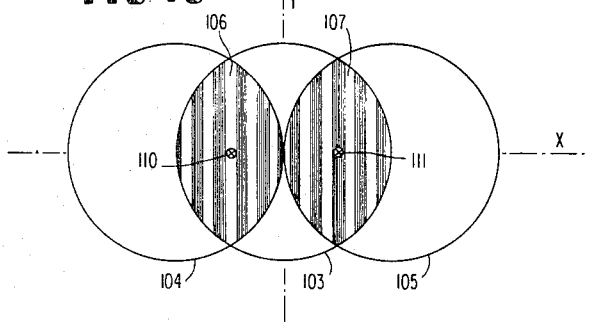

If the carrier 102 moves slightly to the right in FIG. 4A along the X axis, the fringes shift with it. After an incremental motion, the bands that impinge the photodetectors 110 and 111 in FIG. 4B shift to the positions shown in FIG. 4C. Now a bright band impinges the photodetector 110, and a dark band impinges the photodector 111. If the grating 101 has a phase pattern of 400 lines per millimeter, this binary change represents a translation along the X axis of approximately 0.000050 inches. Yet even with this accuracy, this apparatus is relatively easy to construct because the bands that impinge the photodetectors are relatively wide. For example, bands having a width of about 0.1 inch are obtained when $Z_2$ equals about 2 inches and $Z_1$ equals 0.001 inches. See equation (1). Bands of this width facilitate the placement of the photodetectors because their positions can be established with fairly loose tolerances.

This apparatus is essentially insensitive to any changes in the distance between the grating 101 and the photodetectors 110 and 111 along axes 120 and 121. As previously indicated, the size of the fringe fields 106 and 107 changes if $Z_2$ changes, but the number of fringes within the fields does not change. Thus, in FIG. 4B the photodetectors 110 and 111 remain centered on their respective central fringes, notwithstanding any variations in the distance $Z_2$ along axes 120 and 121.

The point source 100 shown in FIG. 4A comprises elements such as a laser 30, negative lens 32 and microscope objective 33 of FIG. 3. The laser 30 can comprise a low power TEM$_{00}$ mode helium neon cylindrical or other like laser. The negative lens 32 and microscope objective lens 33 are movable along the axis 31 in FIG. 3 and focus the light at a focal point FP. The negative lens 32 expands the beam from the laser 30 slightly so as to completely fill the microscope objective lens 33 aperture with a uniform light distribution. A $-4$ mm focal length biconcave lens is a satisfactory negative lens. The microscope objective lens 33 is a conventional objective lens, a 10X N.A. 0.25 objective lens being satisfactory. With a source of this construction, the laser radiation is allowed to overfill the objective, thus producing a well bounded radiation field with radial symmetry as shown in FIG. 4A.

On the other hand a simple laser diode could also be used by itself or in combination with the microscope objective 33. The shape of the laser diode radiating region is approximately rectangular instead of circular. Therefore, when the laser diode is used by itself, the zero and ±1 order distributions are not the radially symmetrical and sharply bounded circles 103, 104 and 105 in FIG. 4A. However, FIG. 4A does constitute an approximate representation of the actual irradiance distributions in the XY plane when the spatially coherent, quasi-monochromatic source comprises only a laser diode. When a laser diode and microscope objective are used in combination, the laser diode radiation is allowed to overfill the microscope objective. Thus, a well-bounded radiation field with greater radial symmetry is produced. With any such "source", the discussions concerning the various position encoders is totally valid and unaffected by the use of the idealized representations 103, 104 and 105, FIG. 4A.

While the apparatus in FIG. 4A is useful in making measurements in one direction, FIG. 5A discloses a carrier with a grating 123 that moves in both the X and Y directions. The grating 123 differs from the grating 101 in FIG. 4A and the difference is most redily understood by referring to FIGS. 1 and 2. In forming the grating 123, the photographic plate 12 is exposed as previously described with reference to step 1 in FIG. 2. However, the plate is then turned 90° and exposed again before it is developed. This double exposure produces superimposed horizontal and vertical single frequency interference patterns.

Referring again to FIG. 5A, when the grating 123 is illuminated with any point source of quasi-monochromatic, spatially coherent light, the grating produces five diffraction cones of interest that are approximated in FIG. 5A and are shown more clearly by a planar projection in FIG. 5B. The vertical phase pattern on the grating produces cones represented by circles 103 through 105 as previously described, these cones producing areas of overlap 106A and 107A. However, the horizontally disposed phase pattern produces a pair of first order cones in the vertical direction designated by reference numerals 114 and 115. Four areas of overlap are important. Arcuate wedge areas 106A and 107A correspond to the areas 106 and 107 shown in FIG. 4B that are independent of the influence exerted by the first order cones 114 and 115. Arcuate wedge areas 116A and 117A are formed by overlapping the zero order cone 103 and the first order cones 114 and 115, and they are independent of any influence by the first order cones 104 and 105. The photodetectors are aligned on the central fringe for each area of overlap. Photodetectors 110 and 111 aligned with the areas 106A and 107A respond to motion along the X axis as previously discussed. Photodetectors 120 and 121 are aligned with the areas 116A and 117A. They sense vertical motion along the Y axis. These four photodetectors are then coupled to the position detection circuit 124 that responds to these signals either for indicating XY motion or for providing an input to an XY positioning servo mechanism.

Figure 6:
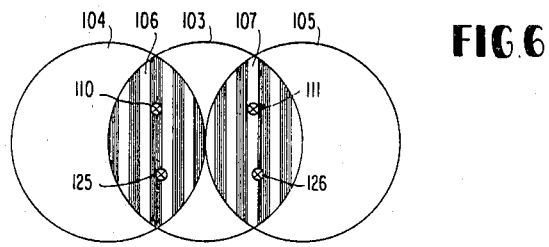
FIG. 6 depicts the fringe patterns produced by the apparatus of FIG. 4A as modified to provide quadrature signals.

FIG. 6 illustrates, diagrammatically, apparatus that generates quadrature signals. Basically this apparatus employs the apparatus shown in FIG. 4A with the addition of photodetectors 125 and 126. Photodetectors 110 and 111 are shifted upwardly but remain positioned on the central fringes. The additional photodetectors 125 and 126 are positioned one-quarter fringe period to the right of each central fringe (i.e. 90° out of phase or in a quadrature position). Thus, as will be readily apparent, the signals from these four photodetectors provide quadrature signals that inherently provide both position and direction information.

Figure 7A:
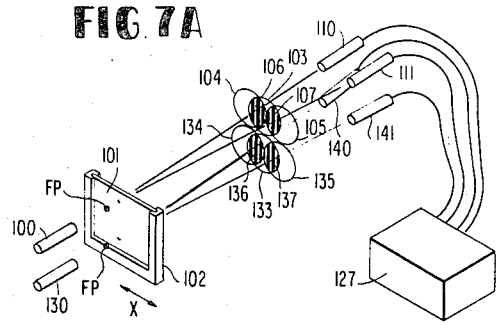
FIG. 7A is a diagram of a position encoder for producing stable quadrature position signals.
Figure 7B:
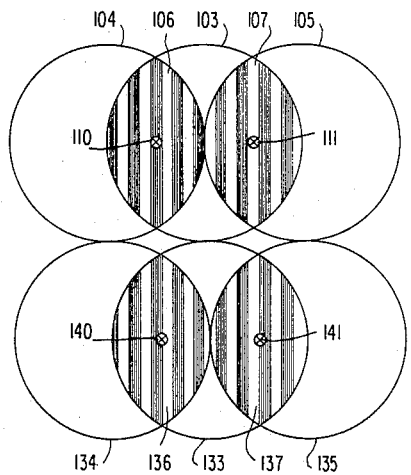
FIG. 7B depicts the fringe patterns that are produced by the position encoder in FIG. 7A.

In each of the foregoing applications, it is assumed that the $Z_1$ distance between the point source of light and the grating remain constant. As apparent, however, such a constant dimension might be difficult to achieve in some practical applications. FIGS. 7A and 7B disclose apparatus which is essentially insensitive to a reasonable range of variations in the $Z_1$ dimension. This again is shown in connection with an apparatus for detecting translation along the X direction only. The resulting signals are conveyed to a position detection system 127 that includes an up-down counter to count the passage of fringes and to provide an accurate indication of motion.

More specifically, a laser light source 100 transmits light through the grating 101 to produce zero and first order cones 103, 104 and 105 with areas of overlap 106 and 107. As shown in FIG. 7B, photodetectors 110 and 111 then provide a first set of signals. Another light source 130 is disposed below the light source 100. It is positioned to produce a zero-order cone 133 and first-order cones 134 and 135 that lie below the diffraction cones produced by light from the source 100. The horizontal, or X, position of source 130 is adjusted to produce overlap areas 136 and 137 whose central fringes are 90° out of phase with the central fringes of overlap areas 106 and 107. Photodetectors 140 and 141 are aligned with these central fringes in overlap areas 136 and 137. With this arrangement, quadrature signals are generated from four central fringes whose position is unaffected by variations in $Z_1$. Increasing $Z_1$ causes the width of the central fringes to decrease, but so long as the photodetector aperture can resolve the central finges, an accurate quadrature signal is produced.

In summary, there has been disclosed a basic intefe-rometer construction that utilizes a holographically recorded, single-frequency, bleached, phase grating for producing stable, high-contrast fringe patterns with high efficiency. Moreover, there has been disclosed a specific application of this interferometer for sensing or controlling the position of a mechanical element. In this application, the grating is moved in a plane that is ortha-gonal to a light axis so the fringe patterns move past detectors. The detectors convert the passage of the fringe patterns into signals that indicate discrete increments of motion by the grating.

It will be apparent from the foregoing discussion, however, that the specific embodiments of this invention that have been disclosed are merely representative. The basic principles can be employed in other embodiments with the attainment of some or all of the advantages of this invention. Therefore, it is an object of the appended claims to cover all such variations and modifications as come within the true spirit and scope of this invention.

What I claim as new and desire to secure by Letters Patent of the United States is:

1. Apparatus for indicating the position of a movable element along a motion axis, said apparatus comprising:

A. interference pattern generating means for generating a first diffraction and a second diffraction that are of different order, that have equal strength and that overlap thereby to produce a first high contrast, low noise interference fringe pattern in a first area of overlap, B. first detection means positioned to view the first interference fringe pattern for producing signals dependent upon the first interference fringe pattern, and C. motion means for producing relative movement of said generating means and said detection means along the motion axis thereby to move said first interference fringe pattern with respect to said detection means.

2. Apparatus as recited in claim 1 wherein said interference pattern generating means includes:
  i. light source means for projecting spatially coherent, quasi-monochromatic light along an axis that is normal to the motion axis, and
  ii. holographically recorded, single frequency, optically thin phase grating means responsive to the light from the light source means for producing said diffractions.

3. Apparatus as recited in claim 2 wherein said motion means connects to said grating means and moves said grating means along said motion axis.

4. Apparatus as recited in claim 2 wherein said detection means includes:
  i. one or more photodetectors for viewing the fringes of said first fringe pattern, and
  ii. circuit means connected to each said photodetector for producing position signals.

5. Apparatus as recited in claim 2 additionally comprising second light source means spaced from said first light source means and illuminating said grating means for producing a third diffraction and a fourth diffraction that are of different orders, that have equal strength and that overlap thereby to produce a second high-contrast, low-noise interference fringe pattern in the area of overlap that is coplanar with the first interference fringe pattern.

6. Apparatus as recited in claim 5 additionally comprising second detection means positioned to view the second interference fringe pattern for producing signals dependent upon said second interference fringe pattern.

7. Apparatus as recited in claim 2 wherein said interference pattern generating means also generates a third diffraction that is of the same order as the second diffraction, that has the same strength as the second diffraction and that overlaps the first diffraction so as to produce a second high-contrast, low-noise interference fringe pattern that is out of phase with the first fringe pattern.

8. The apparatus as recited in claim 7 and further including second detection means positioned to view the second interference fringe pattern for producing signals dependent upon said second fringe pattern.

9. Apparatus as recited in claim 8 wherein
A. the first and second interference fringe patterns are substantially 180° out of phase, and
B. the first and second detection means are positioned to view the central fringes in the first and second interference fringe patterns respectively.

10. The apparatus as recited in claim 9 and further including third and fourth detection means A. positioned to view the first and second interference fringe patterns respectively for producing signals dependent upon those patterns, and
B. spaced from the first and second detection means in a direction normal to said motion axis.

11. The apparatus as recited in claim 10 wherein the third and fourth detection means are offset from the first and second detection means respectively along said motion axis by an amount substantially equal to 90° in phase so that the signals from the four detection means are in phase quadrature.

12. Apparatus as recited in claim 9 wherein the grating means has parallel rulings so that said first and second interference fringe patterns are each composed of substantially straight, parallel fringes oriented perpendicular to said motion axis.

13. Apparatus as recited in claim 9 wherein
A. the grating means has two orthogonal sets of parallel rulings so as to produce also fourth and fifth diffractions that are of the same order as the second diffraction, that have the same strength as the second diffraction and that overlap the first diffraction so as to produce third and fourth high-contrast low-noise interference fringe patterns in the areas of overlap with the first diffraction, said third and fourth fringe patterns being 180° out of phase with one another and being orthogonal to the first and second interference fringe patterns,
B. third and fourth detection means positioned to view the central fringes of the third and fourth interference fringe patterns respectively for producing signals dependent upon those patterns, and
C. second motion means for producing relative motion between the grating means and the third and fourth detection means in a direction normal to said motion axis to move the third and fourth fringe patterns with respect to the third and fourth detection means.

14. Apparatus as recited in claim 9
A. wherein said pattern-generating means also include second spatially coherent quasi-monochromatic light source means spaced from the first light source means in a direction normal to said motion axis, said second source means illuminating the grating means so as to produce fourth, fifth and sixth diffractions,
  (1) the fourth and fifth diffractions being of a different order and of equal strength and overlapping so as to produce a third high-contrast low-noise interference fringe pattern, and
  (2) the fourth and sixth diffractions being of a different order and of equal strength and overlapping to produce a fourth high-contrast low-noise interference pattern, said third and fourth patterns being 180° out of phase with one another and 90° out of phase with respect to the first and second fringe patterns, and
B. further including third and fourth detection means positioned to view the central fringes of the third and fourth interference fringe patterns respectively for producing signals in response to those patterns, the signals from all four of said detection means being in phase quadrature.

15. Apparatus for indicating the position of a movable element along a motion axis, said apparatus comprising
A. light source means for producing spatially coherent, quasi-monchromatic light, B. holographically recorded, single frequency grating means
   (1) positioned to receive light from the light source directed along an axis perpendicular to the motion axis, and
   (2) having a substantially pure sinusoidal phase transmission function whose peak-to-peak phase delay produces first, second and third diffractions, the first and second diffractions being of a different order and equal strength and overlapping so as to interfere to produce a first high-contrast low-noise interference pattern, the first and third diffractions being of a different order and equal strength and overlapping so as to interfere to produce a second high-contrast low-noise interference pattern, said second pattern being 180° out of phase with respect to the first pattern,
C. first detection means positioned to view the first interference pattern for producing position signals, and
D. first motion means for producing relative movement of the grating means and the first detection means along said motion axis thereby to move the first interference fringe pattern relative to the detection means.

16. Apparatus as recited in claim 15 and further including second signal-producing detection means positioned to view the second interference fringe pattern, said second fringe pattern moving relative to the second detection means upon the occurrence of said relative movement due to the first motion means.

17. Apparatus as recited in claim 16 and further including third and fourth signal-producing detection means for viewing the first and second interference fringe patterns respectively, said third and fourth detection means being offset 90° in phase with respect to the first and second detection means in a direction along said motion axis so that the signals from the four detection means are in phase quadrature.

18. Apparatus as recited in claim 16
   A. wherein the grating means has two orthogonal sets of rulings so that the grating means produces fourth and fifth diffractions, the fourth diffraction being of a different order from and having equal strength as the first diffraction and overlapping the first diffraction so as to interfere to produce a third high-contrast low-noise interference fringe pattern, the fifth diffraction being of a different order from and having equal strength as the first diffraction and overlapping the first diffraction so as to interfere to produce a fourth high-contrast low-noise interference pattern, said third and fourth fringe patterns being 180° out of phase with respect to each other and being orthogonal to the first and second interference patterns, and
   B. further including
      (1) third and fourth signal-producing detection means for viewing the third and fourth interference patterns respectively, and
      (2) second motion means for producing relative motion of the grating means and the third and fourth detection means thereby to move the second and third diffraction patterns relative to the third and fourth detection means in a direction normal to said motion axis.

19. Apparatus as recited in claim 16 and further including
   A. second spatially coherent quasi-monochromatic light source means spaced from the first light source means in a direction normal to the motion axis and illuminating the grating means to generate fourth, fifth and sixth diffractions,
      (1) the fourth and fifth diffractions being of a different order and equal strength and overlapping so as to interfere to produce a third high-contrast, low-noise interference fringe pattern adjacent the first pattern, and
      (2) the fourth and sixth diffractions being of a different order and equal strength and overlapping to produce a fourth high-contrast low-noise interference pattern adjacent the second interference pattern, said third and fourth interference patterns being 180° out of phase with respect to each other and 90° out of phase with respect to the first and second interference patterns, and
   B. third and fourth signal-producing detection means positioned to view the third and fourth interference patterns respectively, said third and fourth patterns moving with respect to the third and fourth detection means upon the occurrence of said relative movement due to said first motion means.

20. Apparatus as recited in claim 15 wherein the grating is formed with one or more sets of straight parallel rulings.

* * * * *